US008983369B2

(12) United States Patent
Reyes et al.

(10) Patent No.: US 8,983,369 B2
(45) Date of Patent: Mar. 17, 2015

(54) PROVIDING MOBILE USER DRIVING ALERTS

(75) Inventors: Emerando M. Delos Reyes, Pleasant Hill, CA (US); Benjamin J. Parker, Foster City, CA (US); Samir Ait-Ameur, Fremont, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 67 days.

(21) Appl. No.: 13/465,497

(22) Filed: May 7, 2012

(65) Prior Publication Data

US 2013/0293384 A1 Nov. 7, 2013

(51) Int. Cl.
*H04B 1/06* (2006.01)

(52) U.S. Cl.
USPC ........................................ 455/26.1

(58) Field of Classification Search
USPC ................. 340/180, 441, 446, 669, 994, 969; 455/412.2, 413, 567, 569.1, 569.2, 455/26.1
See application file for complete search history.

(56) References Cited

U.S. PATENT DOCUMENTS

| 6,606,562 | B1 * | 8/2003 | Gifford ........................ 701/32.4 |
| 2002/0065112 | A1 * | 5/2002 | Endoh et al. .................. 455/567 |
| 2006/0003752 | A1 * | 1/2006 | Rivera-Cintron et al. . 455/414.2 |
| 2007/0032194 | A1 * | 2/2007 | Griffin ......................... 455/41.2 |
| 2009/0085728 | A1 * | 4/2009 | Catten et al. ............... 340/425.5 |
| 2009/0224931 | A1 * | 9/2009 | Dietz et al. .................... 340/670 |
| 2013/0019004 | A1 * | 1/2013 | Sylvain ........................ 709/224 |
| 2013/0021176 | A1 * | 1/2013 | Tu et al. ....................... 340/994 |

* cited by examiner

*Primary Examiner* — Hai Phan
*Assistant Examiner* — Zhen Y Wu

(57) ABSTRACT

A system is configured to receive an alert status, associated with a first user device, based on the first user device connecting with a mobile alert device, where the alert status is associated with an instruction to prevent calls from being sent to the first user device, and where the alert status indicates that a user, associated with the first user device, is operating a vehicle. The system is configured to receive a call instruction from a second user device, where the call instruction includes an instruction to place a call from the second user device to the first user device. The system is further configured to send the alert status to the second user device, based on receiving the alert status and the call instruction.

24 Claims, 11 Drawing Sheets

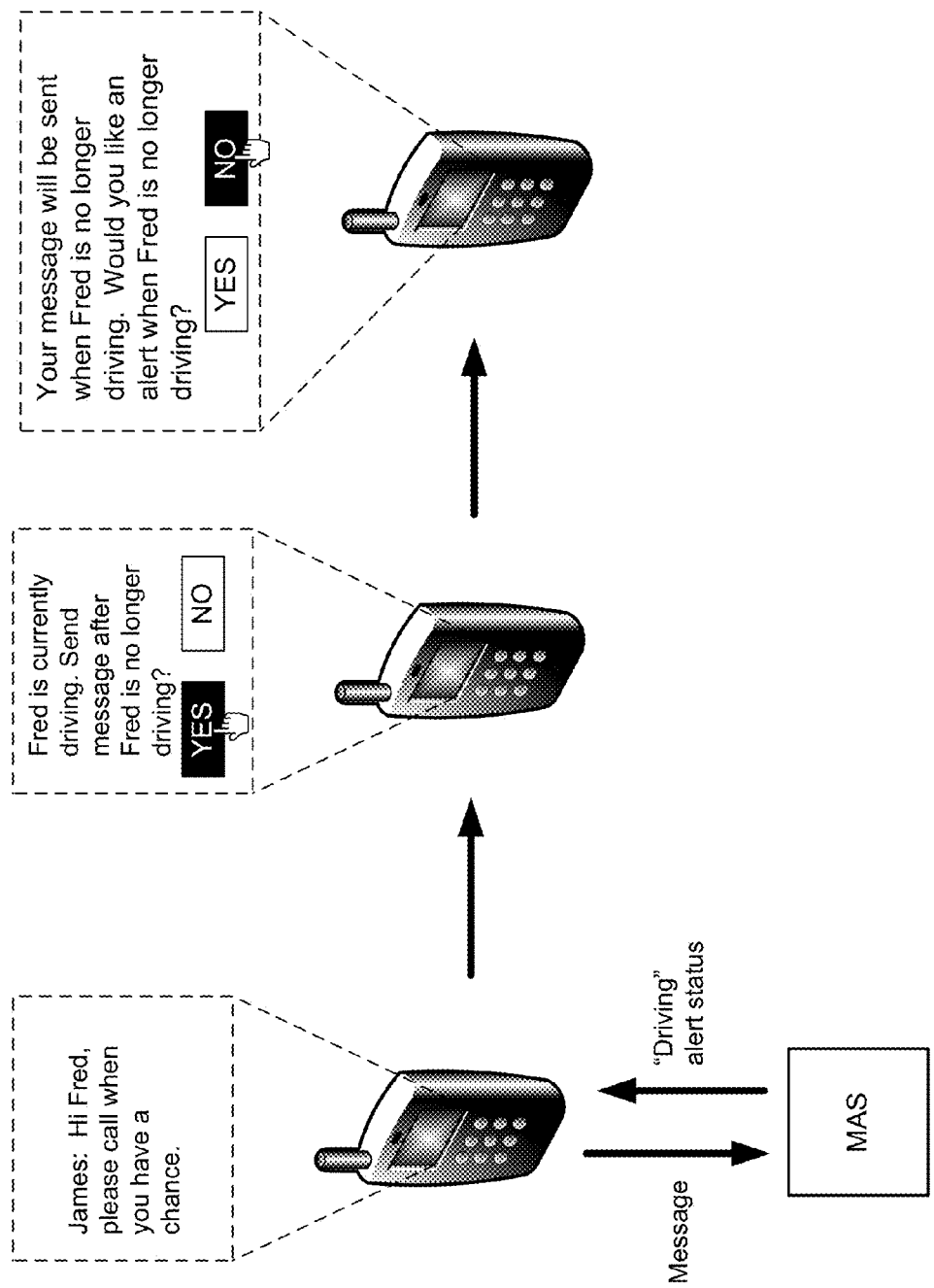

| Call Identifier | Call Time | Call Type | Call Content |
|---|---|---|---|
| 555-555-1234 | 12/28/2001, 5:45 PM | SMS | From James: Hi Fred, please call when you have a chance. |
| 555-555-1000 | 1/1/2002, 12:01 AM | Voice | voicemail.mp3 |
| 555-555-0000 | 1/1/2002, 12:03 AM | MMS | Happy new year.jpg |
| 555-555-0001 | 1/1/2002, 12:05 AM | Voice | |
| 555-555-0002 | 1/1/2002, 12:06 AM | Voice | |
| MargieMomX5 | 1/1/2002, 12:07 AM | IM | From Mom: Happy new year! |

Fig. 5

PROVIDING MOBILE USER DRIVING ALERTS

BACKGROUND

Users often use user devices to exchange voice calls and text messages. During operation of a vehicle, the act of receiving or responding to a call or message by a user poses a safety hazard to the user and to surrounding motorists. Additionally, vehicle laws in many jurisdictions prevent the use of user devices during operation of a vehicle. A sender of a call or message may be unaware that the recipient is operating a vehicle at the time that the sender initiates the call or message.

BRIEF DESCRIPTION OF THE DRAWINGS

FIGS. 1A-1C illustrate an example overview of implementations described herein;

FIG. 5 illustrates an example data structure that may be stored in a mobile alert server;

DETAILED DESCRIPTION OF THE PREFERRED EMBODIMENTS

The following detailed description refers to the accompanying drawings. The same reference numbers in different drawings may identify the same or similar elements.

A system and/or method, as described herein, may identify an alert status of a user device, associated with a recipient user. The system and/or method may notify a sending user with regard to the alert status, in response to the sending user initiating a call to the recipient user. A call may refer to a communication between two or more user devices in the form of a voice call, a short message service (SMS) text, a multimedia message service (MMS) message, an instant message (IM), and/or some other communication type. In some implementations, the alert status may correspond to an indication that the recipient user is currently operating a vehicle (e.g., a motor vehicle, a bicycle, or some other vehicle). The system and/or method may allow the sender to delay the call to a time when the recipient is not operating a vehicle, or to send the call without delay. The system and/or method may alert the sender that the recipient is no longer operating a vehicle and is available to receive calls.

Figure 1A:
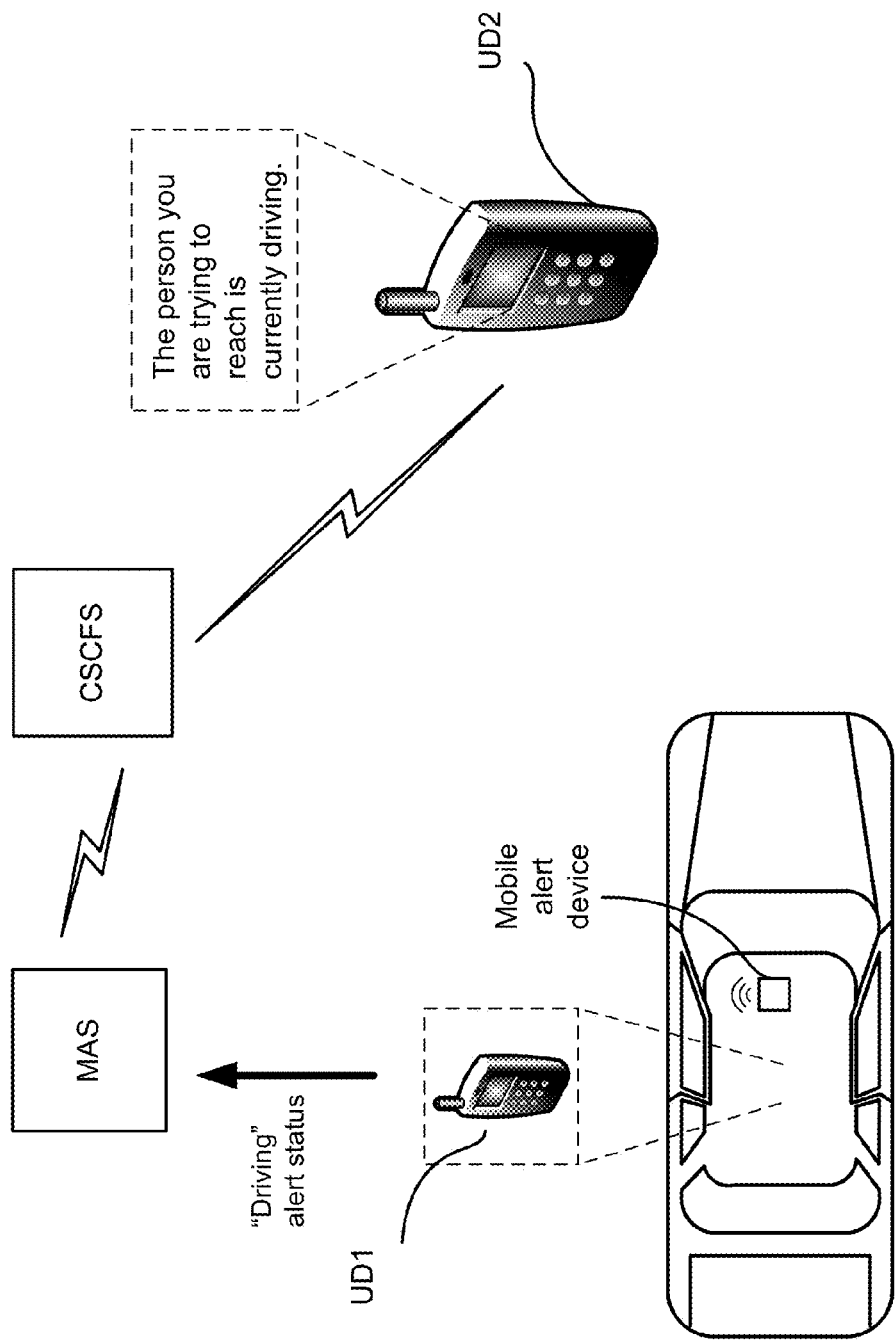
Figure 1C:
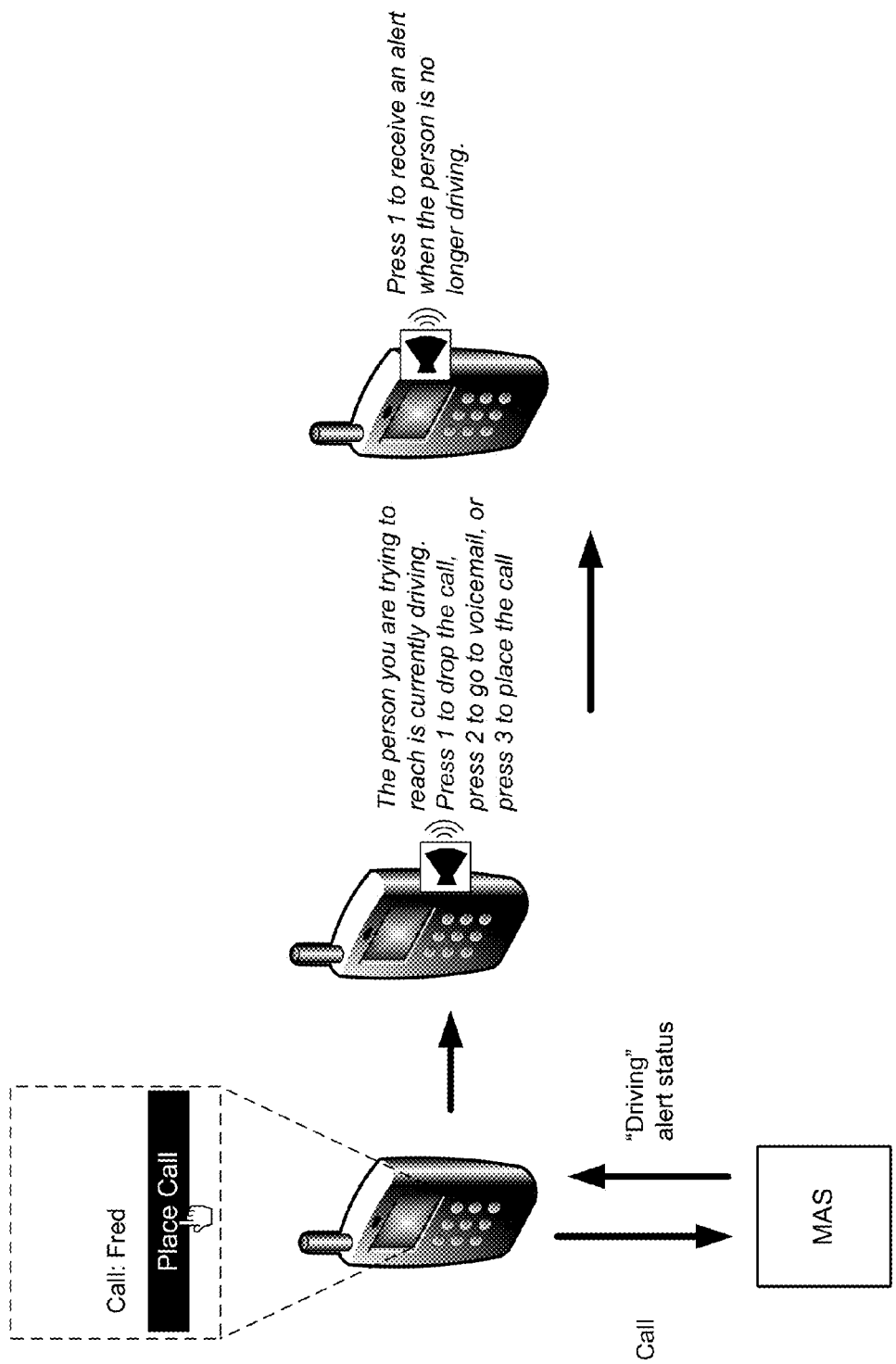

FIGS. 1A-1C illustrate an example overview of an implementation described herein. As shown in FIG. 1A, a first user device (also referred to as "UD1") may send an alert status, associated with UD1, to a mobile alert server (MAS). In some implementations, the alert status may correspond to an indication that the user of UD1 is currently operating a vehicle (e.g., as indicated by an alert status of "driving"). For example, UD1 may receive an alert status (e.g., "driving"), based on connecting with a mobile alert device (e.g., via wireless networking, Bluetooth, radio frequency (RF), a wired connection, and/or some other technique. The mobile alert device may include a peripheral device, such as a module, radio, or some other device capable of communicating with user devices via a wired or wireless connection (e.g., a Bluetooth module, a Bluetooth audio headset, a wired or wireless docking station, and/or some other device). The mobile alert device may be associated with a vehicle (e.g., mounted in or on the vehicle).

Additionally, or alternatively, the alert status may include an interface type (e.g., a headset interface type, a vehicle interface type, and/or some other interface type). In some implementations, the interface type may describe the type of mobile alert device (e.g., an audio headset, a module mounted in a vehicle, etc) interfaced with UD1. For example, an interface between UD1 and a mobile alert device in the form of an audio headset may correspond to a headset interface type. Alternatively, an interface between UD1 and a mobile alert device in the form of a module mounted in or on a vehicle may correspond to a vehicle interface type.

In one implementation, the user, associated with UD1, may connect UD1 to the mobile alert device via a wireless connection (e.g., by placing UD1 within the vehicle, thereby placing UD1 within a connection range of the mobile alert device). In some other implementation, the user, associated with UD1, may connect UD1 to the mobile alert device via a wired connection (e.g., by plugging UD1 into the mobile alert device).

Additionally, or alternatively, UD1 may remove the alert status, based on disconnecting with the mobile alert device (e.g., when UD1 is removed from the vehicle, thereby exiting the connection range of the mobile alert device, and/or by unplugging UD1 from the mobile alert device). In some implementations, a call session control function server (CSCFS) may receive the alert status of UD1 (i.e., "driving") from the MAS.

As further shown in FIG. 1A, assume that a second user device (also referred to as "UD2") initiates a call to UD1. In this case, the CSCFS may receive notification of the call, and identify an alert status associated with UD1. UD2 may receive an indication that the user, associated with UD1, is currently driving, based on the alert status of UD1. In an example shown in FIG. 1A, the indication may be a text message and/or an audio message, such as "The person you are trying to reach is currently driving."

Continuing with the above example, and as shown in FIG. 1B, assume that a user (e.g., "James"), associated with UD2, initiates a call in the form of an SMS text to another user (e.g., "Fred") associated with UD1. In some implementations, the MAS may receive an indication to initiate the call (e.g., by receiving an indication via CSCFS). The MAS may identify an alert status (e.g., "driving") associated with UD1. Based on identifying the alert status, the MAS may execute an instruction to prevent sending the call to UD1, and to send the alert status to UD2. In some implementations, the instruction may prevent sending certain types of calls but allow sending other types of calls (e.g., the instruction may prevent sending text type calls, such as SMS texts, and/or IM texts, but allow sending voice type calls). For example, the instruction may be based on the interface type associated with the interface between UD1 and the mobile alert device (e.g., a headset interface type, a vehicle interface type, and/or some other interface type). In one implementation (e.g., where the interface type is a headset interface type), the instruction may prevent sending text type calls but allow sending voice type calls.

Based on receiving the alert status, UD2 may present the alert status in the form of a message on a display screen of UD2, such as "Fred is currently driving." Additionally, or alternatively, UD2 may select to delay the call, or to send the call without delay, (e.g., by overriding the instruction preventing sending the call to UD1, thereby allowing the call to be sent to UD1). For example, as shown in FIG. 1B, UD2 may present the option to delay the call until after the alert status of UD1 has changed and/or been removed, or to send the call without delay. In the example shown in FIG. 1B, the user, associated with UD2, has selected "yes," thereby causing the MAS and/or the CSCFS to delay sending the call to UD1. In this case, the call will be sent to UD1 when the alert status, associated with UD1, is changed and/or removed. As further shown in FIG. 1B, UD2 may present a message indicating that the message will be sent to the user, associated with UD1, when the alert status has changed and/or been removed user (e.g., corresponding to the user no longer driving). In some other implementation, UD2 may override the instruction to prevent the call, and cause the MAS and/or the CFSCS to send the call without a delay (e.g., if the user, associated with UD2, selects "no" in the example shown in FIG. 1B). Additionally, or alternatively, UD2 may present an option to receive an alert when the alert status of UD1 has changed and/or been removed.

In some implementations, and as shown in FIG. 1C (e.g., in the context of placing a call in the form of a voice call), UD2 may present the alert status and/or options (e.g., in the form of an audio message) to drop the call, to send the call to voicemail, or to send the call, based on receiving the alert status associated with UD1. UD2 may allow the user, associated with UD2, to select an option to delay the call (e.g., via dropping the call, or sending the call to voicemail), or to place the call without delay. For example, the user, associated with UD2, may make the selection by inputting either the number 1 (e.g., to drop the call), the number 2 (e.g., to send the call to voicemail), or the number 3 (e.g., to place the call) via a keypad associated with UD2. Additionally, or alternatively, UD2 may present an option (e.g., in the form of an audio message) to receive an alert when the alert status of UD1 has changed and/or been removed. The systems and/or methods may notify sender users with regard to alert statuses of user devices associated with recipient users, thereby reducing instances of users using user devices while operating a vehicle.

While example implementations of possible systems and/or methods are described with regard to FIGS. 1A-1C in terms of two user devices (i.e., "UD1" and "UD2"), in practice, the systems and/or methods are not so limited and may apply to an environment with any number of user devices. For example, the systems and/or methods may apply in an environment with any number of recipient user devices exchanging call transactions with any number of sender user devices. Further, a single user device may perform the functions of both a recipient user device and a sender user device.

While systems and/or methods will be described in terms of an availability of a recipient user with respect to operating a vehicle, the systems and/or methods are not so limited. For example, the systems and/or methods may be used to identify periods during which the recipient user is unavailable to receive a call for any reason, including or excluding periods during which the recipient user is operating a vehicle. In some implementations, the periods during which the recipient user is unavailable to receive a call may correspond to when the recipient user is in a meeting, when the recipient user is sleeping, when the recipient user is traveling on an airplane, and/or some other period during which the recipient user has defined as an unavailable period.

Figure 2:
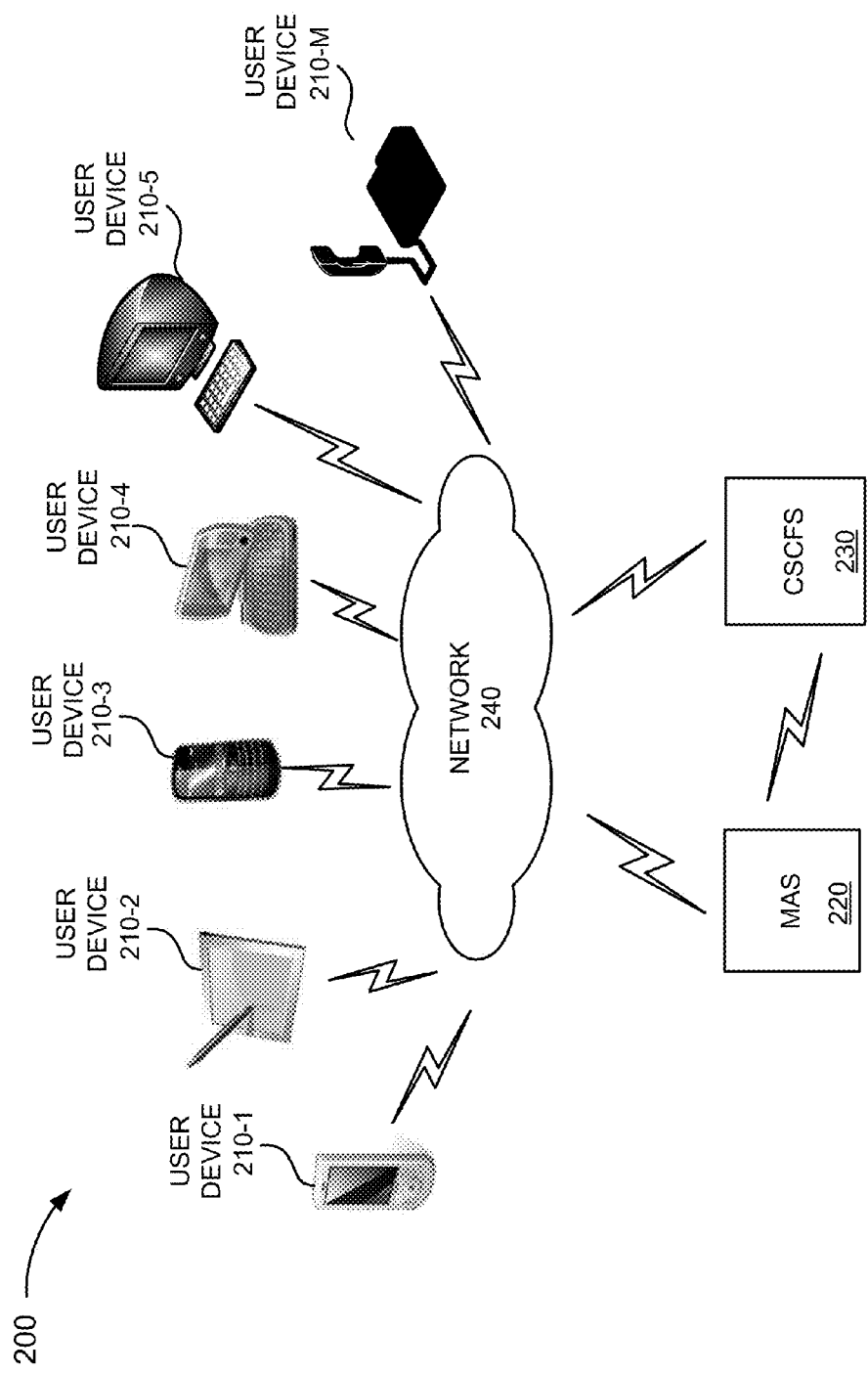
FIG. 2 illustrates an example environment in which systems and/or methods, described herein, may be implemented.

FIG. 2 illustrates an example environment 200 in which systems and/or methods, described herein, may be implemented. As shown in FIG. 2, environment 200 may include user devices 210-1 through 210-M (where M≥1) (collectively referred to as "user devices 210," and individually as "user device 210"), MAS 220, CSCFS 230, and network 240. While FIG. 2 shows a particular number and arrangement of devices, in practice, environment 200 may include additional devices, fewer devices, different devices, or differently arranged devices than are shown in FIG. 2. For example, each of servers 220-230 may be implemented as multiple, possibly distributed, devices. Alternatively, two or more of servers 220-230 may be implemented within a single device. Further, a function described as being performed by one server may be performed by another server.

User device 210 may include any portable or non-portable device capable of communicating via a network. For example, user device 210 may correspond to a mobile communication device (e.g., a mobile telephone or a personal digital assistant (PDA)), a portable computer device (e.g., a laptop or a tablet computer), or another type of portable device. User device 210 may also, or alternatively, include a landline communication device, a client device, such as a set top box for a television, a digital video recorder (DVR), a desktop computer or the like. User device 210 may also correspond to a recipient user device (referred to as "UD1") with regard to FIGS. 1A-1C and/or a sender user device (referred to as "UD2") with regard to FIGS. 1A-1C. Further, it will be apparent that, at any given time, user device 210 may act as a recipient user device or as a sender user. Additionally, or alternatively, a single user device 210 may perform the functions of both a recipient user device and a sender user device.

MAS 220 may include a server device, such as a computing device. In some implementations, MAS 220 may receive and/or store information, such as alert status information corresponding to one or more user devices 210. MAS 220 may also receive and/or store information for calls, such as telephone numbers, call time, IM identifiers, call type (e.g., SMS, MMS, IM, voice, etc), and call content (SMS text content, image content, etc).

CSCFS 230 may include a server device, such as a computing device. In one implementation, CSCFS 230 may receive and/or store alert status information, and identify information of user devices 210 associated with the alert status (e.g., the telephone numbers, subscriber identity module (SIM) card numbers, serial numbers, etc). Additionally, or alternatively, CSCFS 230 may receive call signals from user device 210, and determine an alert status associated with user device 210. Additionally, or alternatively, CSCFS 230 may send call signals to user device 210, in response to receiving call instructions. In one implementation, the interactions between or among CSCFS 230, MAS 220 and/or user device 210 may be performed using the hypertext transfer protocol (HTTP), the secure HTTP (HTTPS), the user datagram protocol (UDP), and/or the session initiation protocol (SIP). In one implementation, the interactions between or among CSCFS 230, MAS 220 and/or user device 210 may be performed using another type of protocol.

Network 240 may include any type of network or a combination of networks. For example, network 240 may include a local area network (LAN), a wireless LAN (WLAN), a wide area network (WAN) (e.g., the Internet), a metropolitan area network (MAN), an ad hoc network, a telephone network (e.g., a Public Switched Telephone Network (PSTN), a cellular network, or a voice-over-IP (VoIP) network), or a combination of networks. Each of user device 210, MAS 220, and/or CSCFS 230 may connect to network 240 via a wireless connection, a wired connection, or a combination thereof.

Figure 3:
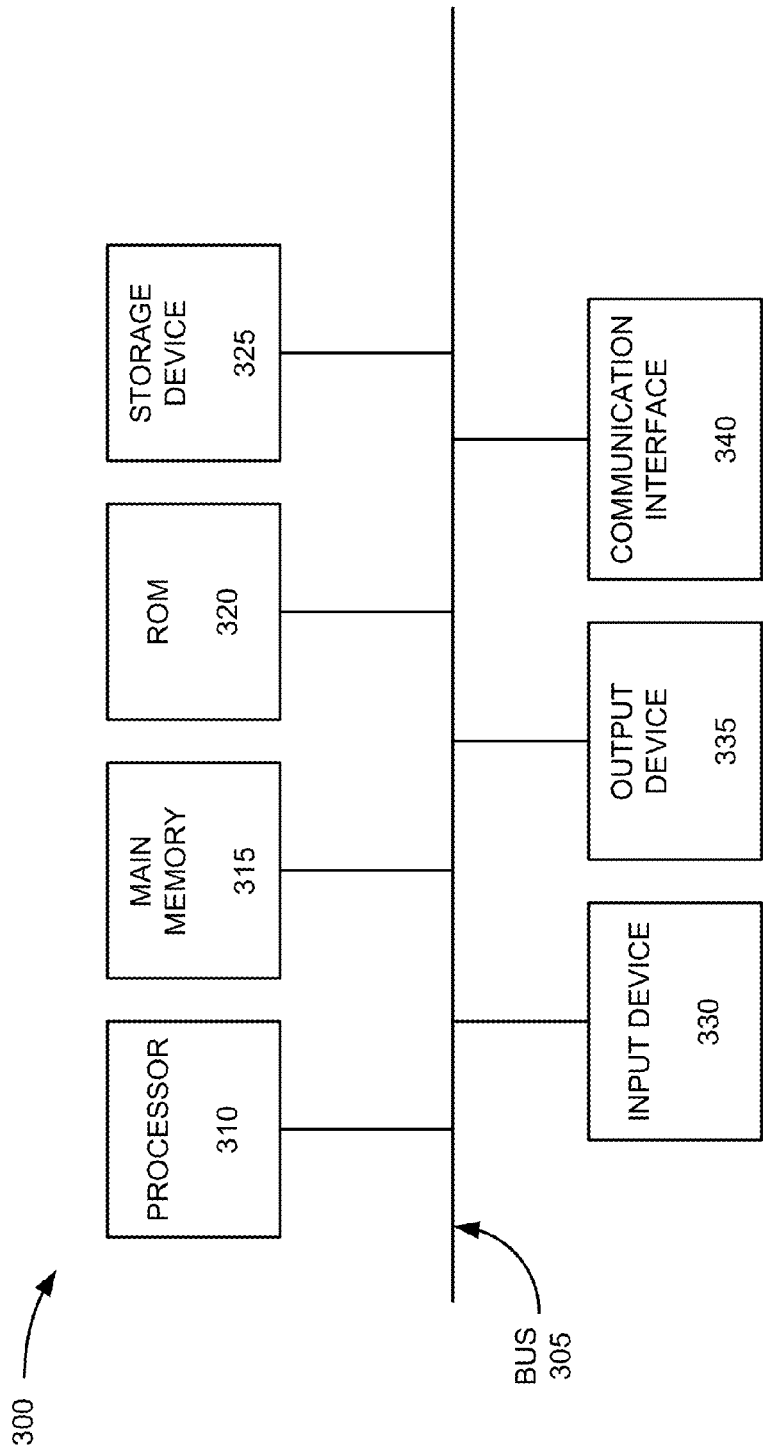
FIG. 3 illustrates example components of a device that may be used within the environment of FIG. 2.

FIG. 3 illustrates example components of a device 300 that may be used within environment 200 of FIG. 2. Device 300 may correspond to user device 210 and/or servers 220-230. Each of user device 210 and/or servers 220-230 may include one or more devices 300.

As shown in FIG. 3, device 300 may include a bus 305, a processor 310, a main memory 315, a read only memory (ROM) 320, a storage device 325 (also referred to as a local storage device or local storage), an input device 330, an output device 335, and a communication interface 340. In some implementations, device 300 may include additional components, fewer components, different components, or differently arranged components. For example, in the context of user device 210, device 300 may include a speed determination unit to determine a traveling speed of device 300.

Bus 305 may include a path that permits communication among the components of device 300. Processor 310 may include a processor, a microprocessor, an application specific integrated circuit (ASIC), a field programmable gate array (FPGA), or another type of processor that interprets and executes instructions. Main memory 315 may include a random access memory (RAM) or another type of dynamic storage device that stores information or instructions for execution by processor 310. ROM 320 may include a ROM device or another type of static storage device that stores static information or instructions for use by processor 310. Storage device 325 may include a magnetic storage medium, such as a hard disk drive, or a removable memory, such as a flash memory.

Input device 330 may include a mechanism that permits an operator to input information to device 300, such as a control button, a keyboard, a keypad, or another type of input device. Output device 335 may include a mechanism that outputs information to the operator, such as a light emitting diode (LED), a display, or another type of output device. Communication interface 340 may include any transceiver-like mechanism that enables device 300 to communicate with other devices or networks. In one implementation, communication interface 340 may include a wireless interface, a wired interface, or a combination of a wireless interface and a wired interface.

Device 300 may perform certain operations, as described in detail below. Device 300 may perform these operations in response to processor 310 executing software instructions contained in a computer-readable medium, such as main memory 315. A computer-readable medium may be defined as a non-transitory memory device. A memory device may include space within a single physical memory device or spread across multiple physical memory devices.

The software instructions may be read into main memory 315 from another computer-readable medium, such as storage device 325, or from another device via communication interface 340. The software instructions contained in main memory 315 may cause processor 310 to perform processes that will be described later. Alternatively, hardwired circuitry may be used in place of or in combination with software instructions to implement processes described herein. Thus, implementations described herein are not limited to any specific combination of hardware circuitry and software.

Figure 4:
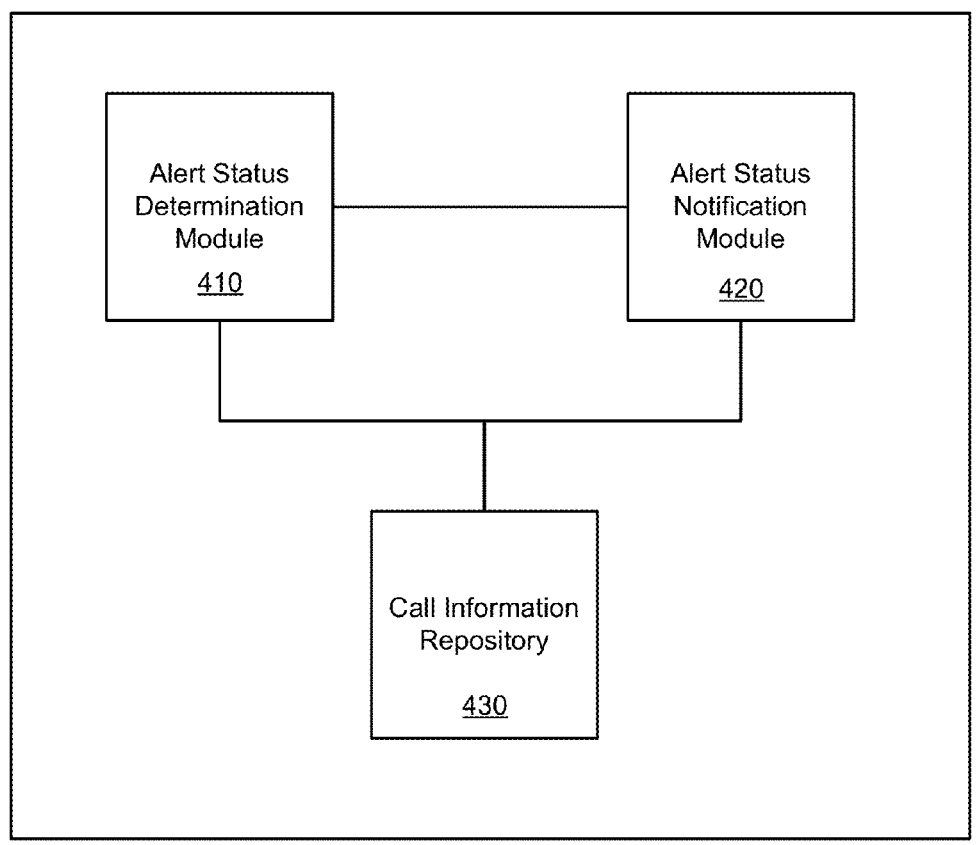
FIG. 4 illustrates example functional components of an example system.

FIG. 4 illustrates example functional components of an example system 400. System 400 may include functional components implemented by MAS 220. In another implementation, system 400 may include functional components implemented by one or more devices, which include or exclude MAS 220. For example, CSCFS 230 may include some or all of the functional components of system 400.

As shown in FIG. 4, system 400 may include modules 410-430. In some implementations, system 400 may include fewer, additional, or different modules. Any, or all, of modules 410-430 may be implemented by one or more memory devices (such as main memory 315) and/or one or more processors (such as processor 310). Furthermore, multiple modules may be associated with the same memory device and/or processor (e.g., one memory device, or one set of memory devices, may store information associated with two or more of modules 410-430).

Alert status determination module 410 may determine an alert status associated with user device 210. For example, module 410 may receive an alert status, based on user device 210 connecting with a mobile alert device (e.g., via wireless networking, Bluetooth, radio frequency (RF), and/or some other technique). In an example implementation, the mobile alert device may be associated with a vehicle (e.g., mounted to or in a vehicle). In some implementations, module 410 may receive an alert status, based on user device 210 connecting with the mobile alert device (e.g., when a user, associated with user device 210, enters a connection range of the mobile alert device by placing user device 210 within the vehicle to connect with the mobile alert device). In some implementations, the alert status may correspond to a period during which a user, associated with user device 210, is operating a vehicle, or is otherwise unable to receive calls.

Additionally, or alternatively, module 410 may receive an alert status, based on user device 210 exceeding a threshold speed, as determined by a speed determination unit, associated with user device 210. For example, a threshold speed may be 15 kilometers per hour (kph), 20 kph or the like. Additionally, or alternatively, module 410 may determine an alert status, based on some other technique.

In some implementations, module 410 may detect the removal of an alert status associated with user device 210. For example, module 410 may detect the removal of an alert status, based on user device 210 disconnecting from the mobile alert device, such as when user device 210 exits a connection range of the mobile alert device (e.g., when a user, associated with user device 210, removes user device 210 from the vehicle). In some implementations, the removal of the alert status may correspond to a time during which a user, associated with user device 210, is not operating a vehicle, or is otherwise available to receive calls.

Additionally, or alternatively, module 410 may detect the removal of an alert status, based on user device 210 falling below a threshold speed for a period of time, as determined by a speed determination unit, associated with user device 210. In one example, module 410 may determine the removal of the alert status, based on user device 210 falling below the threshold speed of 15 kph for 3 minutes. In another example, module 410 may determine the removal of alert status based on user device 210 falling below the threshold speed of 20 kph for 4 minutes. In another implementation, a threshold speed and period of time may be some other speed and/or period of time.

Additionally, or alternatively, module 410 may determine the alert status, based on manual input of the alert status. For example, a user may interact with module 410 (e.g., via user device 210) to provide an alert status and/or to remove and/or change an existing alert status. Additionally, or alternatively, module 410 may determine the alert status based on some other technique.

Alert status notification module 420 may notify a sender user device (i.e., "UD2") with respect to an alert status of a recipient user device (i.e., "UD1"). For example, module 420 may receive information regarding an alert status of UD1 from module 410, and notify UD2 with respect to the received alert status. Module 420 may notify UD2 with respect to the alert status of UD1, based on UD2 initiating a call with UD1 during a period in which UD1 is associated with an alert status (e.g., "driving"). Additionally, or alternatively, module 420 may send an indication to UD2 with regard to the alert status of UD1, when the alert status associated with UD1 has changed, and/or has been removed, as described above. Module 420 may send the indication to UD2 in the form of a message, which can be displayed by UD2, and/or in the form of an audio indication, which may be outputted by a speaker associated with UD2. Some examples of notifying UD2 of an alert status are described above with respect to FIGS. 1A-1C. In some other implementation, module 420 may notify some other device with regard to an alert status of a user device 210 in environment 200 using some other technique.

Call information repository 430 may receive and/or store information (e.g., telephone numbers, call times, call types, IM identifiers and/or call content), associated with call transactions from UD2 to UD1. For example, call information repository 430 may receive and/or store information for a call transaction based on UD2 receiving an alert status (e.g., "driving"), associated with UD1, and based on UD2 selecting to delay sending the call to after the alert status of UD1 has changed and/or been removed. Referring back to the example shown in FIG. 1B, assume that UD2 receives an alert status indicating that a user, associated with UD1, is driving, based on UD2 sending a call to UD1. As shown in an example in FIG. 1B, a user, associated with UD2, may select to send the call to after the alert status, associated with UD1, has changed and/or been removed. In this case, call information repository 430 may receive and/or store the information associated with the call transaction. In an example implementation, call information repository 430 may send call information for a call transaction, associated with UD2, to UD1, based on the change and/or removal of the alert status from UD1. Some examples of information stored in call information repository 430 are described later with respect to FIG. 5.

FIG. 5 illustrates an example data structure 500 that may be stored by a server, such as MAS 220. In one implementation, data structure 500 may be stored in a memory of MAS 220. In another implementation, data structure 500 may be stored in a memory separate from, but accessible by, MAS 220. MAS 220 may store multiple data structures 500 associated with one or more user devices 210. A particular instance of data structure 500, associated with one user device 210, may contain different information and/or fields than another instance of data structure 500, associated with another user device 210.

In some implementations, data structure 500 may correspond to call information repository 430. In some implementations, data structure 500 may include additional fields, fewer fields, different fields, or differently arranged fields than are shown in FIG. 5. While only one data structure 500 is shown in FIG. 5, in practice, servers 220-230 may store any number of data structures. In some implementations, each data structure 500 may correspond to a call transaction information list for a single recipient user device 210. Additionally, or alternatively, data structure 500 may receive and/or store multiple entries or rows, each entry or row corresponding to a call transaction from a sender user device (i.e., "UD2") to a recipient user device (i.e., "UD1"), associated with data structure 500. In an example shown in FIG. 5, data structure 500 stores information for six unique call transactions from sender user devices 210 to a single UD1 associated with data structure 500. In practice, data structure 500 may store any number of call transactions. As shown in FIG. 5, data structure 500 may include call identifier field 510, call time field 520, call type field 530, and/or call content field 540.

Call identifier field 510 may receive and/or store identifiers associated with one or more sender user devices 210. For example, as shown in FIG. 5, data structure 500 may store six unique identifiers, corresponding to six different call transactions from six different sender user devices 210. The call identifier may include information to identify sender user devices 210, such as a telephone number, an IM identifier (e.g., an IM screen name), and/or some other identifier. In some implementations, the same identifier may be associated with multiple call transactions to UD1 associated with data structure 500.

Call time field 520 may receive and/or store information to log a date and time associated with a call transaction. In an example shown in FIG. 5, call time field 520 may store a date and time of "Dec. 28, 2001, 5:45 PM", associated with a call transaction from the telephone number "555-555-1234."

Call type field 530 may receive and/or store information to log the type of call associated with a call transaction. For example, the call type may be an SMS text, an MMS file, and/or a voice call. Call type field 530 may be used to determine what call information is presented, and how it is presented to the recipient user device 210, associated with data structure 500. In an example shown in FIG. 5, call type field 530 may store a call type of "SMS" associated with a call transaction from the telephone number "555-555-1234."

Call content field 540 may receive and/or store content associated with the call transaction. For example, call content field 540 may store content associated with an SMS text, an MMS file, and/or a voice call. In an example shown in FIG. 5, call content field 540 may store the text message "From James: Hi Fred, please call when you have a chance," associated with the call transaction from the telephone number "555-555-1234." In another example shown in FIG. 5, call content field 540 may store audio content in the form of a sound file, associated with a voice call transaction from the telephone number "555-555-1000." In another example shown in FIG. 5, call content field 540 may store image content in the form of an image file, associated with an MMS call transaction from the telephone number "555-555-0000." In another example shown in FIG. 5, call content field may store the text message "From Mom: Happy new year!" associated with the call transaction from the IM identifier "MargieMomX5."

Figure 6:
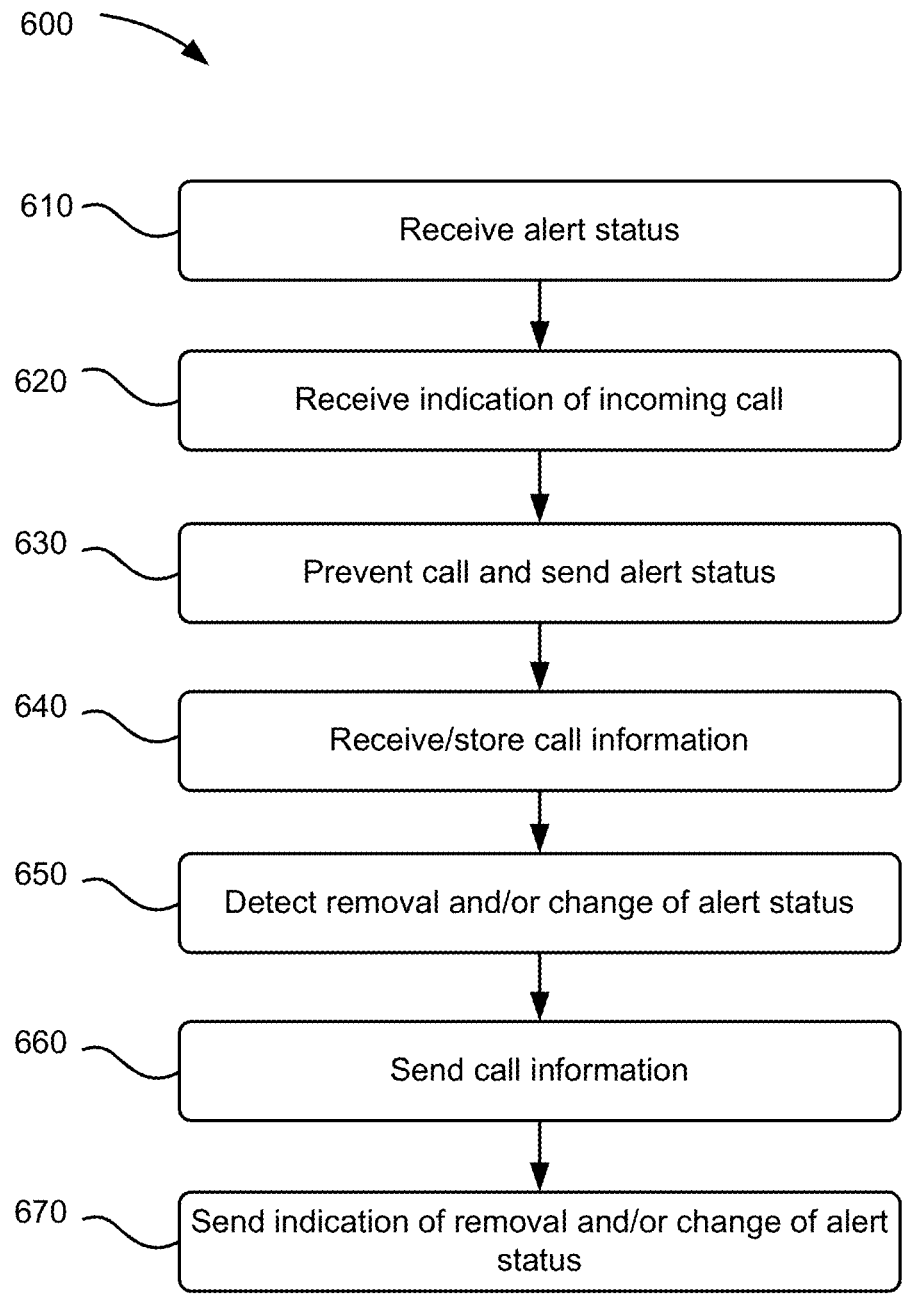
FIG. 6 illustrates a flowchart of an example process for exchanging alert status and/or call information between user devices.

FIG. 6 illustrates a flowchart of an example process 600 for exchanging alert status and/or call information between user devices 210. In one implementation, process 600 may be performed by one or more components of MAS 220, such as processing unit 305 of MAS 220. In another implementation, one or more blocks of process 600 may be performed by one or more components of another device (e.g., one or more of user devices 210 and/or CSCFS 230), or any group of devices including or excluding MAS 220.

As shown in FIG. 6, process 600 may include receiving an alert status (block 610). For example, as described above with respect to module 410, MAS 220 may receive an alert status (e.g., a "driving" status), associated with a recipient user device (i.e., "UD1"). For example, MAS 220 may receive an alert status from UD1, based on UD1 connecting to a mobile alert device, associated with a vehicle, as previously described. Additionally, or alternatively, MAS 220 may receive an alert status from UD1, based on UD1 exceeding a threshold speed, as previously described. Additionally, or alternatively, MAS 220 may receive an alert status, based on manual input from a user, associated with UD1, and/or some other technique.

Process 600 may also include receiving an indication of an incoming call (block 620). For example, MAS 220 may receive an indication of an incoming, associated with a sender user device (i.e., "UD2"), from CSCFS 230. For example, MAS 220 may receive an indication from CSCFS 220 that UD2 is sending a call to a telephone number associated with UD1.

Process 600 may further include preventing the call and sending the alert status (block 630). For example, as described above with respect to module 420, MAS 220 may execute instructions to prevent the call from being sent, and send the alert status, associated with UD1, to UD2, based on UD2 initiating a call with UD1 when UD1 is associated with an alert status. MAS 220 may send the alert status in the form of a message displayed on UD2, in the form of an audio recording outputted by a speaker associated with UD2, and/or some other form.

Process 600 may also include receiving and/or storing call information (block 640). For example, as described above with respect to call information repository 430, MAS 220 may receive and/or store information (e.g., telephone numbers, call times, call types, and/or call content), associated with the call transaction from UD2 to UD1. In some implementations, MAS 220 may receive and/or store information for a call transaction based on UD2 receiving an alert status (e.g., "driving"), associated with UD1, and based on UD2 selecting to delay sending the call after the alert status, associated with UD1, has changed and/or been removed, as previously described. In some implementations, block 640 may be omitted in an example where UD2 selects to send the call, without delay, as previously described.

Process 600 may further include detecting removal and/or change of the alert status (block 650). For example, as described above with respect to module 410, MAS 220 may detect the removal and/or change of the alert status, associated with UD1. In one implementation, MAS 220 may detect the removal and/or change of the alert status associated with UD1, based on UD1 disconnecting from the mobile alert device, as previously described. Additionally, or alternatively, MAS 220 may detect the removal and/or change of the alert status, based on UD1 falling below a threshold speed for a period of time, as previously described. Additionally, or alternatively, MAS 220 may detect the change and/or removal of the alert status, based on manual input from a user, associated with UD1, and/or some other technique.

Process 600 may include sending call information (block 660). For example, MAS 220 may send call information received from UD2, based on UD2 selecting to send the call after the alert status, associated with UD1, has changed and/or been removed. In this case, MAS 220 may send the call information to UD1, based on MAS 220 detecting the removal and/or change of the alert status, associated with UD1.

Process 600 may also include sending an indication of the removal and/or change of the alert status (block 670). For example, as described above with respect to module 420, MAS 220 may send an indication to UD2 with regard to the alert status of UD1, based on MAS 220 detecting the change and/or removal of the alert status, associated with UD1. In practice, the detection of the change and/or removal of the alert status may correspond to a time when a user, associated with UD1, is no longer operating a vehicle, or is otherwise available to receive a call. Additionally, or alternatively, block 670 may be omitted if a user, associated with UD2, does not select to be notified when the alert status, associated with UD1, has changed and/or been removed.

In some implementations, blocks 630-670 may be omitted in an implementation where the call is allowed to be sent (e.g., when the call is a voice type call and the instruction allows sending voice type calls).

While an example of process 600 is described in FIG. 6 in terms of two user devices (i.e., "UD1" and "UD2"), in practice, process 600 is not so limited and may apply to an environment with any number of user devices 210. For example, process 600 may apply in an environment with any number of recipient user devices exchanging information with any number of sender user devices. Further, a single user device 210 may perform the functions of both a recipient user device and a sender user device.

While an example of process 600 is described as being performed by MAS 220, in practice, process 600 may be performed by CSCFS 230 and/or by a combination of MAS 220 and CSCFS 230. For example, CSCFS 230 may receive the alert status (block 610) from MAS 220, and/or from UD1, as described above. CSCFS 230 may also receive an indication of incoming calls from UD1 (block 620). Additionally, or alternatively, CSCFS 230 may send the alert status (block 630), based on receiving the alert status and receiving indication of the incoming call, as described above. Additional or fewer steps of process 600 may be performed by CSCFS 230 than what is described.

Figure 7:
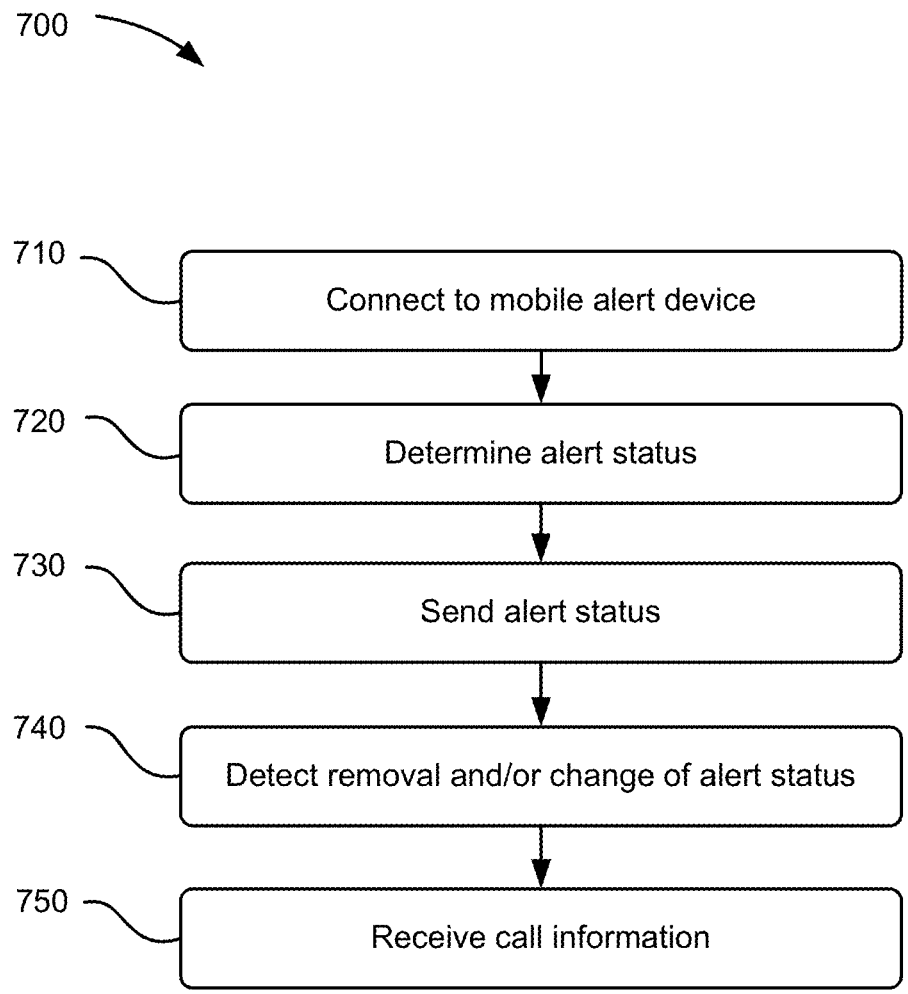
FIG. 7 illustrates a flowchart of an example process for exchanging alert status and/or call information between user devices.

FIG. 7 illustrates a flowchart of an example process 700 for exchanging alert status and/or call information between user devices 210. In one implementation, process 700 may be performed by one or more components of user device 210, such as processing unit 305 of user device 210. In one implementation, one or more blocks of process 700 may be performed by one or more components of another device (e.g., one or more of servers 220-230), or any group of devices including or excluding user device 210.

As shown in FIG. 7, process 700 may include connecting to a mobile alert device (block 710). For example, as described above with respect to module 410, a recipient user device (i.e., "UD1") may connect with a mobile alert device associated with a vehicle. In some implementations, UD1 may connect with the mobile alert device via wireless networking, such as Bluetooth, radio frequency (RF), and/or some other technique. For example, UD1 may connect with the mobile alert device based on UD1 entering a connection range of the mobile alert device (e.g., when a user, associated with UD1, places UD1 within or near the vehicle). UD1 may connect to the mobile alert device to receive an alert status from the mobile alert device. In some implementations, block 710 may be omitted from process 700 (e.g., in an implementation where UD1 receives an alert status from some other source).

Process 700 may further include determining an alert status (block 720). For example, as described above with respect to module 410, UD1 may receive an alert status (e.g., "driving" and/or "unavailable") from the mobile alert device, based on UD1 connecting with the mobile alert device. Additionally, or alternatively, UD1 may generate an alert status based on UD1 exceeding a threshold speed, as previously described. Additionally, or alternatively, UD1 may receive an alert status via manual input from a user, associated with UD1. In some other implementation, UD1 may receive an alert status via some other technique.

Process 700 may also include sending the alert status (block 730). For example, as described above with respect to module 410, UD1 may send the alert status to MAS 220, based on UD1 determining the alert status (e.g., in response to connecting with the mobile alert device, receiving an alert status from a user, associated with UD1, and/or some other technique).

Process 700 may further include detecting the removal and/or change of the alert status (block 740). For example, as described above with respect to module 410, UD1 may detect the removal and/or change of the alert status associated with UD1, based on UD1 disconnecting from the mobile alert device, as previously described. Additionally, or alternatively, UD1 may detect the removal and/or change of the alert status, based on UD1 falling below a threshold speed for a period of time, as previously described. Additionally, or alternatively, UD1 may detect the removal and/or change of the alert status, based on manual input from a user, associated with UD1.

Process 700 may include receiving call information (block 750). For example, UD1 may receive call information (e.g., telephone number, call time, call type, and/or call content) for a call transaction, associated with a sender user device (i.e., "UD2"), from MAS 220 and/or CSCFS 230. UD1 may receive the call information, based on UD1 detecting the removal and/or change of the alert status associated with UD1. For example, assume that UD2 receives an alert status (e.g., "driving"), in response to placing a call to UD1 at a time during which UD1 is associated with the alert status. Further, assume that UD2 selects an option to drop the call or send the call to voicemail, as described above with respect to FIG. 1C. In this case, UD1 may receive call information associated with the call (e.g., telephone number, call time, call type, and/or call content), based on UD1 detecting the removal and/or change of the alert status. In some other implementation, assume that UD2 sends a call in the form of an SMS text to UD1, at a time during which UD1 is associated with the alert status. Further, assume that UD2 selects an option to send the message after the alert status, associated with UD1, has changed and/or been removed, as described above with respect to FIG. 1B. In this case, UD1 may receive call details associated with the SMS text, based on UD1 detecting the removal and/or change of the alert status. An example of receiving call information, based on detecting the removal and/or change of the alert status, is described later with respect to FIG. 9.

While an example of process 700 is described in FIG. 7 in terms of two user devices (i.e., "UD1" and "UD2"), in practice, process 700 is not so limited and may apply to an environment with any number of user devices 210. For example, process 700 may apply in an environment with any number of recipient user devices exchanging information with any number of sender user devices. Further, a single user device 210 may perform the functions of both a recipient user device and a sender user device.

Figure 8:
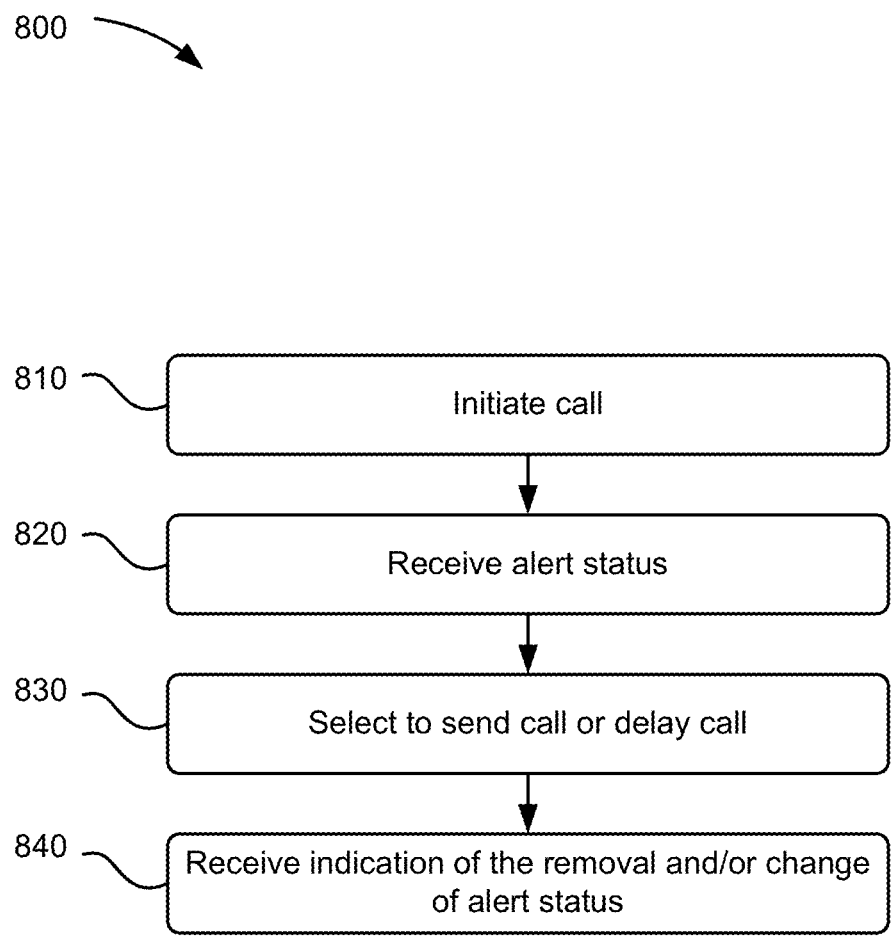
FIG. 8 illustrates a flowchart of an example process for exchanging alert status information between user devices.

FIG. 8 illustrates a flowchart of an example process 800 for exchanging alert status information between user devices 210. In one implementation, process 800 may be performed by one or more components of user device 210, such as processing unit 305 of user device 210. In one implementation, one or more blocks of process 800 may be performed by one or more components of another device (e.g., one or more of servers 220-230), or any group of devices including or excluding user device 210.

As shown in FIG. 8, process 800 may include initiating a call (block 810). For example, a sender user device (i.e., "UD2") may initiate a call in the form of a voice call, SMS text, MMS file, IM, etc, to a recipient user device (i.e. "UD1").

Process 800 may also include receiving an alert status (block 820). For example, as described above with respect to module 420, UD2 may receive an alert status (e.g., "driving") from MAS 220, based on initiating the call to UD1. In some implementations, the alert status may correspond to a period during which a user, associated with UD1, is operating a vehicle, or is otherwise unavailable to receive calls.

Process 800 may also include selecting to send the call or to delay the call (block 830). For example, as described above with respect to FIGS. 1B-1C, UD2 may select to send the call or delay the call, based on receiving instructions from a user, associated with UD2. In some implementations (e.g., in the context of UD2 initiating a call to UD1 in the form of a voice call), selecting to delay the call may include selecting to forward the call to voicemail, selecting to drop the call, and/or selecting to cause both UD1 and UD2 to ring when the alert status of UD1 changes and/or is removed. In some other implementations (e.g., in the context of UD2 initiating a call to UD1 in the form of an SMS text, MMS file, and/or some other message type), UD2 may select to delay the call by causing MAS 220 and/or CSCFS 230 to send the SMS text, MMS file, IM and/or some other message type, in response to detecting the removal and/or change of the alert status from UD1. In some implementations, UD2 may select to send the call without delay, thereby overriding any instructions, associated with the alert status, preventing MAS 220 and/or CSCFS 230 from sending calls to UD1.

Process 800 may also include receiving indication of the removal and/or change of the alert status (block 840). For example, UD2 may receive an indication of the removal and/or change of the alert status, associated with UD1, from MAS 220 and/or UD1. Some examples of UD2 receiving an indication of the removal of the alert status are described above with respect to call information repository 430 and FIG. 6. Additionally, or alternatively, block 840 may be omitted (e.g., in an example where UD2 selects an option to not receive an indication of the removal of the alert status, associated with UD1, as shown in FIG. 1B).

While an example of process 800 is described in FIG. 8 in terms of two user devices (i.e., "UD1" and "UD2"), in practice, process 800 is not so limited and may apply to an environment with any number of user devices 210. For example, process 800 may apply in an environment with any number of recipient user devices exchanging information with any number of sender user devices. Further, a single user device 210 may perform the functions of both a recipient user device and a sender user device.

Figure 9:
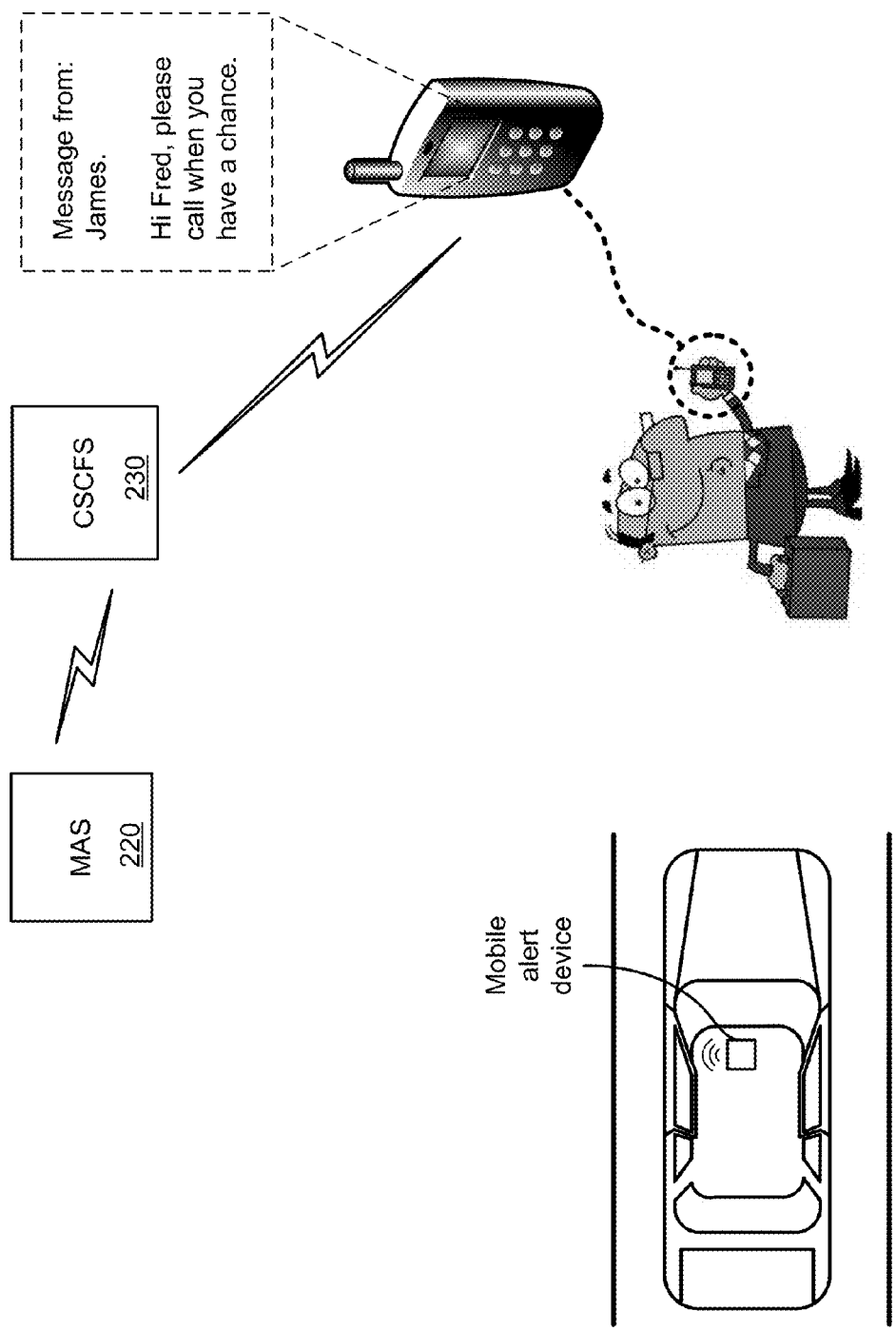
FIG. 9 illustrates an example implementation described herein.

FIG. 9 is a diagram of an example implementation described herein. FIG. 9 may illustrate a continuation of an example shown in FIG. 1A. Referring back to FIG. 1A, assume that a recipient user device (i.e., "UD1"), connects to a mobile alert device associated with a vehicle (e.g., when UD1 is placed within the vehicle, thereby entering a connection range of the mobile alert device, as shown in FIG. 1). Returning to FIG. 9, assume that UD1 disconnects from the mobile alert device, associated with the vehicle (e.g., when UD1 is removed from the vehicle, thereby exiting the connection range of the mobile alert device). UD1, MAS 220, and/or CSCFS 230 may detect the removal of the alert status, based on UD1 disconnecting from the mobile alert device. As described above with respect to call information repository 430, and FIGS. 6-7, UD1 may receive information for a call transaction, associated with a call from a sender user device (i.e., "UD2") from MAS 220, based on the removal of the alert status from UD1. In an example shown in FIG. 9, the information for the call transaction includes an SMS text (e.g., "Message from: James. Hi Fred, please call when you have a chance"). In some other implementations, the information for the call transaction may include content for an audio file, an image file, and/or some other file.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks have been described with regard to FIGS. 6-8, the order of the blocks may be modified in other implementations. Further, non-dependent blocks may be performed in parallel.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
  receiving, by one or more devices, an alert status, associated with a first user device,
    the alert status being associated with an instruction to prevent calls from being sent to the first user device,
    the alert status indicating that a user, associated with the first user device, is operating a vehicle, and
    the first user device being different than each of the one or more devices;
  receiving, by the one or more devices, a call instruction from a second user device,
    the call instruction including an instruction to place a call from the second user device to the first user device, and
    the second user device being different than each of the one or more devices;
  generating, by the one or more devices and based on receiving the call instruction, a message,
    the message being further based on the alert status, and
    the message including an indication that the user is operating the vehicle;
  sending, by the one or more devices and without sending the call from the second user device to the first user device, the message to the second user device; and
  detecting, by the one or more devices, a removal of the alert status, thereby allowing calls to be sent to the first user device,
    detecting the removal of the alert status including:
      detecting the removal of the alert status based on disconnecting the first user device from a mobile alert device.

2. The method of claim 1, further comprising:
  receiving an override instruction from the second user device to override the instruction to prevent calls to be sent to the first user device; and
  sending the call to the first user device based on receiving the override instruction.

3. The method of claim 1, further comprising:
  receiving, by one or more devices, call information associated with the call instruction; and
  sending, by one or more devices, the call information to the first user device based on detecting the removal of the alert status.

4. The method of claim 1, further comprising:
  sending an indication of the removal of the alert status to the second user device based on detecting the removal of the alert status.

5. The method of claim 1, where receiving the alert status includes:
  receiving the alert status when a speed of the first user device exceeds a threshold speed.

6. The method of claim 5, where detecting the removal of the alert status further includes:
  detecting the removal of the alert status when the speed of the first user device falls below the threshold speed for a particular period of time.

7. The method of claim 1, where receiving the alert status includes:
  receiving the alert status based on connecting the first user device with the mobile alert device.

8. The method of claim 1, where
  the alert status includes an interface type, and
  the instruction to prevent calls from being sent to the first user device includes:
    an instruction to prevent sending a first type of call, based on the interface type, and
    an instruction to permit sending a second type of call based on the interface type.

9. A system comprising:
  one or more devices to:
    receive an alert status associated with a first user device,
      the alert status being associated with an instruction to prevent calls from being sent to the first user device,
      the alert status indicating that a user, associated with the first user device, is operating a vehicle, and
      the first user device being different than each of the one or more devices;
    receive a call instruction from a second user device,
      the call instruction including an instruction to place a call from the second user device to the first user device, and
      the second user device being different than each of the one or more devices;
    generate, based on receiving the call instruction, a message,
      the message being further based on the alert status, and the message including an indication that the user is operating the vehicle;
send, without sending the call from the second user device to the first user device, the message to the second user device;
receive call information associated with the call instruction;
detect a removal of the alert status,
the one or more devices, when detecting the removal of the alert status, being to:
detect the removal of the alert status based on disconnecting the first user device from a mobile alert device; and
send the call information to the first user device based on detecting the removal of the alert status.

10. The system of claim 9, where the one or more devices are further to:
send an indication of the removal of the alert status to the second user device, based on detecting the removal of the alert status.

11. The system of claim 9, where the one or more devices are further to:
receive an override instruction from the second user device to override the instruction to prevent calls to be sent to the first user device; and
send the call to the first user device based on receiving the override instruction.

12. The system of claim 9, where, when receiving the alert status, the one or more devices are to:
receive the alert status when a speed of the first user device exceeds a threshold speed.

13. The system of claim 12, where, when detecting the removal of the alert status, the one or more devices are further to:
detect the removal of the alert status when the speed of the first user device falls below a threshold speed for a particular period of time.

14. The system of claim 9, where, when receiving the alert status, the one or more devices are to:
receive the alert status based on connecting the first user device with the mobile alert device.

15. The system of claim 9, where
the alert status includes an interface type, and
the instruction to prevent calls from being sent to the first user device includes:
an instruction to prevent sending a first type of call, based on the interface type, and
an instruction to permit sending a second type of call based on the interface type.

16. A non-transitory computer-readable medium storing instructions, the instructions comprising:
a plurality of instructions which, when executed by one or more processors, cause the one or more processors to:
receive an alert status, associated with a first user device, based on the first user device connecting with a mobile alert device,
the alert status being associated with an instruction to prevent calls from being sent to the first user device,
the alert status indicating that a user, associated with the first user device, is operating a vehicle;
receive a call instruction from a second user device,
the call instruction including an instruction to place a call from the second user device to the first user device;
generate, based on receiving the call instruction, a message,
the message being further based on the alert status, and
the message including an indication that the user is operating the vehicle;
send, without sending the call from the second user device to the first user device, the message to the second user device; and
detect a removal of the alert status, thereby allowing calls to be sent to the first user device,
the one or more instructions to detect the removal of the alert status including:
one or more instructions to detect the removal of the alert status based on disconnecting the first user device from a mobile alert device.

17. The non-transitory computer-readable medium of claim 16, where the instructions further include:
one or more instructions to receive an override instruction from the second user device to override the instruction to prevent calls to be sent to the first user device; and
one or more instructions to send the call to the first user device based on receiving the override instruction.

18. The non-transitory computer-readable medium of claim 16, where
the alert status includes an interface type, and
the instruction to prevent calls from being sent to the first user device includes:
an instruction to prevent sending a first type of call, based on the interface type, and
an instruction to permit sending a second type of call based on the interface type.

19. The non-transitory computer-readable medium of claim 16, where the instructions further include:
one or more instructions to send an indication of the removal of the alert status to the second user device based on detecting the removal of the alert status.

20. The non-transitory computer-readable medium of claim 16, where
the one or more instructions to receive the alert status further include:
one or more instructions to receive the alert status when a speed of the first user device exceeds a threshold speed, and
the one or more instructions to detect the removal of the alert status further include:
one or more instructions to detect the removal of the alert status when the speed of the first user device falls below the threshold speed for a particular period of time.

21. A system comprising:
one or more devices to:
receive an alert status, associated with a first user device, based on the first user device connecting with a mobile alert device,
the alert status being associated with an instruction to prevent calls from being sent to the first user device, and
the first user device being different than each of the one or more devices;
receive a call instruction from a second user device,
the call instruction including an instruction to place a call from the second user device to the first user device, and
the second user device being different than each of the one or more devices;
generate, based on receiving the call instruction, a message, the message being further based on the alert status;

send, without sending the call from the second user device to the first user device, the message to the second user device; and remove, based on detecting that the first user device is disconnected from the alert mobile device, the alert status.

22. The system of claim 21, where the one or more devices are further to:

receive an override instruction from the second user device to override the instruction to prevent calls to be sent to the first user device; and send the call to the first user device based on receiving the override instruction.

23. The system of claim 21, where the alert status includes an interface type, and the instruction to prevent calls from being sent to the first user device includes:

an instruction to prevent sending a first type of call, based on the interface type, and an instruction to permit sending a second type of call based on the interface type.

24. The system of claim 21, where the one or more devices are further to:

send an indication of the removal of the alert status to the second user device based on detecting the removal of the alert status.

\* \* \* \* \*